June 20, 1961  K. MEYER  2,988,781
METHOD OF CONVEYING GREEN PELLETIZED MATERIAL
Filed Jan. 2, 1958

INVENTOR.
KURT MEYER

United States Patent Office 2,988,781
Patented June 20, 1961

2,988,781
METHOD OF CONVEYING GREEN PELLETIZED MATERIAL
Kurt Meyer, Frankfurt am Main, Germany, assignor to Dravo Corporation, Pittsburgh, Pa., a corporation of Pennsylvania
Filed Jan. 2, 1958, Ser. No. 706,815
5 Claims. (Cl. 18—48)

This invention relates to material conveying and more particularly to the conveying of finely-divided material which has been formed into pellets, as practiced for example in the processing or sintering of metallic ores.

In the preparation of certain ore for further processing, the ore is moistened and formed into pellets of more or less uniform size, usually ranging somewhere between about ¾ of an inch and 1¼ inches in diameter. These pellets in their green form are very fragile and easily crushed or broken. The transfer of these pellets from the forming machine to the sintering conveyor has presented a considerable problem in some cases because of the high percentage of breakage.

The present invention has for its object to provide a method of and apparatus for the conveying of green pellets which will not only carry them from one place to another, but which in so doing, will compact the pellets and increase their strength, cause them to pick up loose material, screen out broken pieces, and reduce breakage. A further advantage of my invention is that the conveyor distributes the pellets in transit so as to discharge them evenly onto the sintering conveyor or other receiving apparatus.

This invention may be more fully understood by reference to the accompanying drawings, in which.

Figure 1:
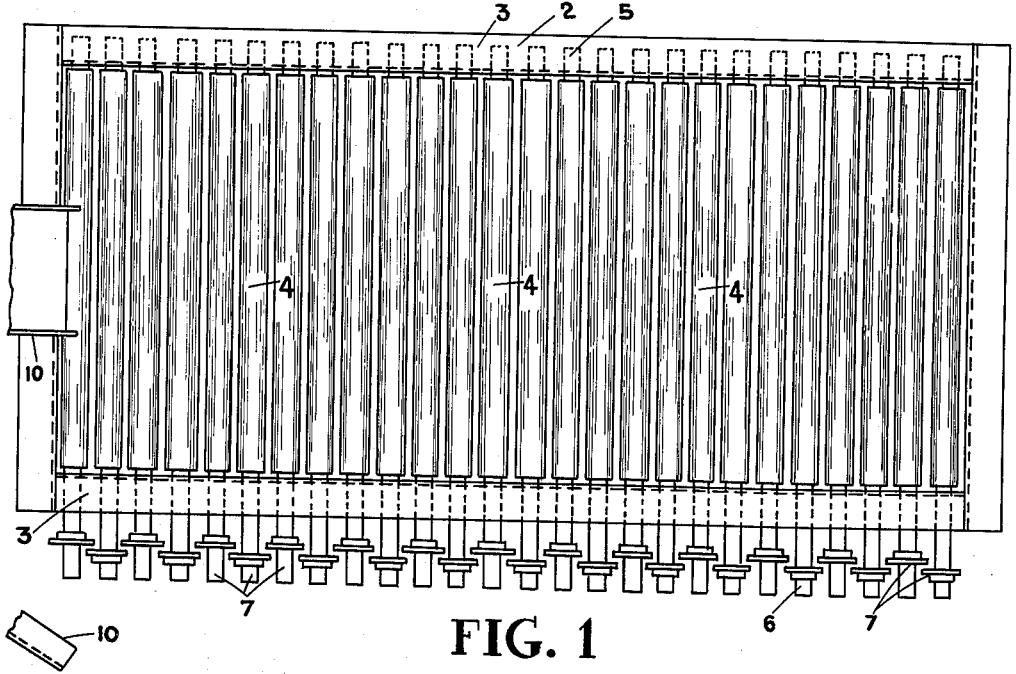
FIG. 1 is a top plan view of a conveyor for the practice of my invention.
Figure 2:
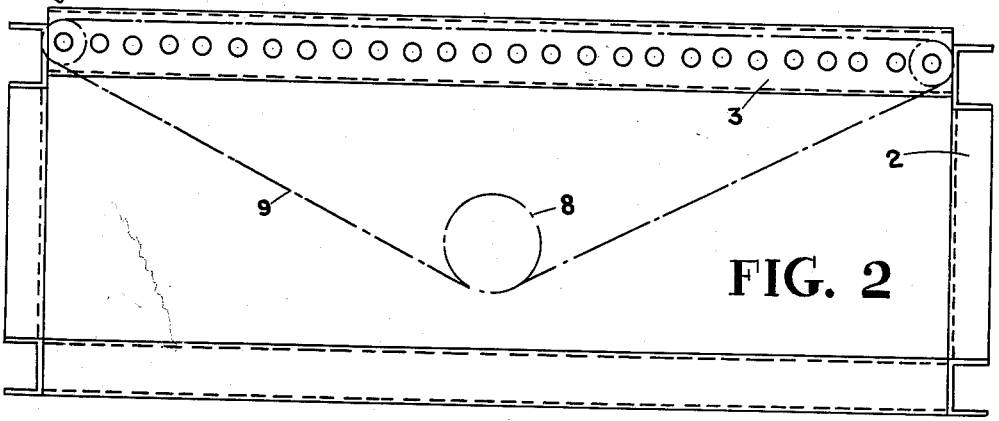
FIG. 2 is a side elevation thereof.

Referring first to FIGS. 1 and 2 of the drawings, 2 designates an elongated supporting frame which may be of any desired length, or which may be one of several sections. It has parallel side members 3 at the top. Rotatably supported in these side members are a series of transverse rollers 4, each of which has a neck 5 at one end which has a bearing in one of the side members 3 and having a longer roll neck 6 at the opposite end which is journaled in the other side member 3, and which is extended beyond the frame. These rollers are each provided with a sprocket wheel for engaging a driving chain, the sprocket wheels for the several rollers being designated 7. Because of the close spacing of the rollers the sprockets on alternate rollers are staggered so as to provide adequate clearance, and the drive chain, which for clarity of illustration is not shown in FIG. 1, is wide enough to simultaneously engage both series of sprockets, or there may be parallel side chains.

In the drawings there is schematically indicated a driving motor 8. This motor drives a chain 9 which passes over the sprockets of the two end rollers of the series, and which extends horizontally over and engages the tops of the sprockets of each of the rollers so that all of the rollers are simultaneously driven in the same direction and preferably at the same speed. The motor 8 is a variable speed motor or may include a variable speed drive mechanism so that the rollers may be driven at an optimum speed. The conveyor in a lengthwise direction may be horizontal or may be somewhat tilted in either direction from one end toward the other. In the direction of its width, the axis of each roller is horizontal.

In dotted lines at one end of the conveyor there is indicated a discharge chute 10 which delivers the pellets to the receiving end of the conveyor which is here illustrated as being the left-hand end. The chute 10 is relatively narrow as compared to the whole width of the conveyor, at least less than half the width, and the conveyor itself may be of substantially the width of a sintering belt or other apparatus to which the pellets are to be delivered.

Figure 4:
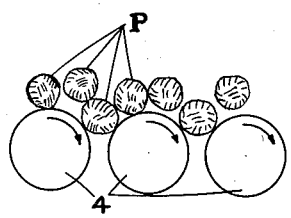
FIG. 4 is a schematic view showing the operation of the conveyor.

In the operation of the conveyor, pellets are discharged from the chute 10 in a more or less steady stream or succession. The rollers are rotated in a direction in which the tops of the rollers are rotating toward the discharge end of the conveyor. As the pellets are discharged onto the conveyor they are rotated by contact with the rollers and by contact with other pellets previously discharged onto the conveyor. This causes them to spread laterally across the width of the conveyor. The natural tendency of an individual pellet would be to remain in the valley between two adjacent rollers with very little traction tending to carry it to the discharge end. However where there is a mass of pellets, the pellets contact each other and are urged by the pressure and friction of the oncoming pellets to move progressively over the top of each roller 4, eventually reaching the discharge end of the conveyor. This is illustrated in the diagram in FIG. 4 wherein the pellets are designated P. The pellets being engaged in the valleys between the rollers are caused to rotate by their frictional contact with the revolving rollers, and they of course roll against one another. While the action is very gentle, it will compact the pellets and make them more firm and dense. This is important because the pellets being formed of a mass of finely-divided ore or earthen material moistened with water are extremely fragile and easily broken. The conveying action above described by rolling and turning the pellets making them round and more dense, imparts added strength to them so that they are less likely to be broken when they are discharged onto a sintering band or other processing apparatus.

The pellets are made to a substantially uniform diameter and in common practice they are usually of a size not smaller than ¾ of an inch in diameter, nor larger than about 1¼ inches. The rollers 4 are therefore spaced close enough together so that the pellets cannot drop between them, and preferably they are so spaced that the pellets have at least their upper periphery and preferably more, above the tops of the rollers 4. If the valleys between the rollers are too deep and too wide, too much impedance is offered to their easy travel, and those first entering a valley between two rollers would not escape.

From a practical standpoint it is desirable to have the rollers as large in diameter as may be used so as to reduce the number of rollers. On the other hand, the rollers should not be so small that the pellets will roll too easily from one to another. As an example, a good working arrangement might be for the rollers 4 to be about 3 inches in diameter where the pellets are from ¾ to 1 inch in diameter, and it appears that the rollers should never be more than ten times the diameter of the pellets nor less than one-half the diameter of the pellets. After it is determined what size pellets are to be transported, one skilled in the art can readily determine the optimum diameter of the rollers, taking into consideration the economy in keeping the number of rolls to a minimum and the speed of rotation of the rolls. The latter factor is in turn determined also by the rate at which the pellets are delivered to the conveyor and the rate at which the receiving conveyor is operated.

Figure 3:
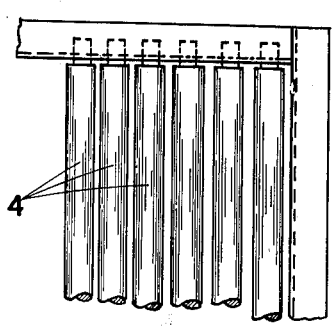
FIG. 3 is a fragmentary plan view thereof showing increased spacing of the rolls near the discharge end.

As shown in FIG. 3, it is desirable toward the discharge end of the conveyor to slightly increase the space between adjacent rolls so as to permit any fragments or under-sized pellets to drop through between the rollers and thus be sorted out from the sound, usable pellets.

The compacting and the densifying action of the conveyor has heretofore been mentioned. A further advantage of the conveyor is that in being rolled in this manner, loose fragments and particles will be picked up by the damp surface of the pellets and loose particles on the surface of the pellets will be compacted into the surface on which they are loosely carried or pressed into the surface of another pellet which is brought into contact with it. Thus the conveyor may actually function as a means for pelletizing or increasing the size of pellets by also feeding loose material onto the conveyor or onto the pellets which are being carried along by the conveyor.

While I have shown and described a specific form of apparatus, it will be understood that this is by way of illustration and that various changes and modifications may be made to suit the environment in which the conveyor is employed, and the nature of the pellets which are being transported.

I claim:

1. The method of conveying and compacting previously formed fragile green pellets of finely-divided loose particles from one apparatus to another and simultaneously compacting them which comprises discharging the pellets onto a conveyor comprising a series of parallel smooth surface rollers with a valley being formed between each two rollers, rotating the rollers continuously in the same direction, and maintaining a rate of delivery of the pellets sufficient to cause the oncoming pellets to aid in progressing the pellets previously discharged onto the rollers out of the valleys between the successive rolls from one end of the conveyor toward the other.

2. The method of conveying and compacting previously formed fragile green pellets of finely-divided loose particles from one apparatus to another and simultaneously compacting them which comprises discharging the pellets in a continuous succession onto an elongated conveyor bed comprised of a series of parallel smooth surface rollers spaced from one another a distance less than the diameter of the pellets and having their axes transverse to the length of the bed, the rate of discharge being such as to maintain some of the pellets in contact with others on the bed rotating the rollers simultaneously in the same direction with the top surfaces of the rolls rotating in a direction toward which the pellets are to be conveyed, and compacting the pellets by rolling contact with the rollers and with one another and simultaneously effecting their progress from one end of the bed toward the other.

3. The method of conveying and compounding previously formed fragile green pellets of finely divided loose particles defined in claim 2 in which loose material is supplied to the pellets while they are being conveyed by the rollers.

4. The method of conveying and compounding previously formed fragile green pellets of finely divided loose particles defined in claim 2 in which the diameter of the rollers with reference to the diameter of the pellets is in the ratio ranging from about one-half the diameter of the pellets to about ten times the diameter.

5. The method of conveying and compounding previously formed fragile green pellets of finely divided loose particles defined in claim 2 in which the pellets are supplied to the conveyor bed in an area constituting less than half the full width of the conveyor bed and utilizing the rolling action to distribute the pellets laterally across the width of the bed.

References Cited in the file of this patent

UNITED STATES PATENTS

| | | |
|---|---|---|
| 838,402 | Gunckel | Dec. 11, 1906 |
| 1,380,691 | Tuoky | June 7, 1921 |
| 1,557,877 | Rae | Oct. 20, 1925 |
| 1,777,039 | Hatch | Sept. 30, 1930 |
| 1,861,665 | Owen | June 7, 1932 |
| 2,054,440 | Paxton | Sept. 15, 1936 |
| 2,411,274 | Kerian | Nov. 19, 1946 |
| 2,441,154 | Kerian | May 11, 1948 |
| 2,609,917 | Gotthardt | Sept. 9, 1952 |
| 2,778,056 | Wynne | Jan. 22, 1957 |
| 2,786,232 | Larsen et al. | Mar. 26, 1957 |
| 2,807,534 | Haley et al. | Sept. 24, 1957 |
| 2,828,852 | Lorig | Apr. 1, 1958 |